United States Patent [19]

Kaufman

[11] 4,054,673

[45] * Oct. 18, 1977

[54] PROCESS FOR DEEP FRYING OF CHICKEN

[76] Inventor: Harvey R. Kaufman, 1310 Echo Park Ave., Los Angeles, Calif. 90026

[*] Notice: The portion of the term of this patent subsequent to Mar. 18, 1991, has been disclaimed.

[21] Appl. No.: 241,451

[22] Filed: Apr. 5, 1972

Related U.S. Application Data

[63] Continuation-in-part of Ser. No. 31, Jan. 2, 1970, abandoned.

[51] Int. Cl.$^2$ .............................................. A23L 1/315
[52] U.S. Cl. ................................... 426/302; 426/438; 426/305
[58] Field of Search .................... 99/1, 107, 355, 403, 99/407, 408; 426/302, 305, 438, 523

[56] References Cited

U.S. PATENT DOCUMENTS

| | | | |
|---|---|---|---|
| 3,169,069 | 2/1965 | Hanson et al. | 426/302 |
| 3,282,460 | 11/1966 | Boznango | 99/107 X |
| 3,466,997 | 9/1969 | Hartzog | 99/107 X |
| 3,669,674 | 6/1972 | Klug et al. | 426/305 |

*Primary Examiner*—Joseph M. Golian

[57] ABSTRACT

A method for preparing fried chicken by a deep fat process, which method includes the submersion of previously prepared chicken parts into preheated oil or shortening for a particular period of time, removal of said chicken parts from said oil or shortening for a very short time so as to separate same from contact with each other and to substantially cool the exterior portions of such parts, immersion again into said oil or shortening for a predetermined period of time, and then removing said chicken parts from said oil and placing same in a heat holding unit adapted to permit the parts which were first cooked to be first sold to the public. The method contemplates use of a unique mixture of batter so that the said chicken parts have a particular batter coating consistency which insures their unique taste, texture and appearance.

5 Claims, 6 Drawing Figures

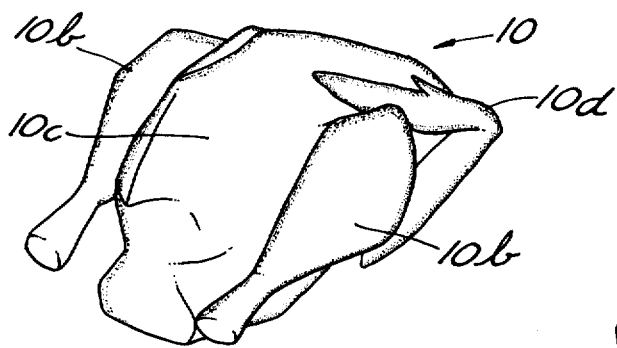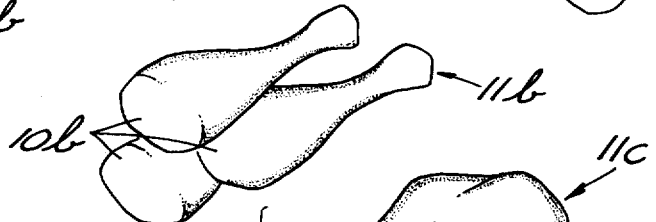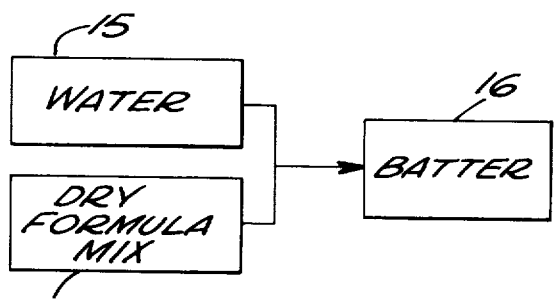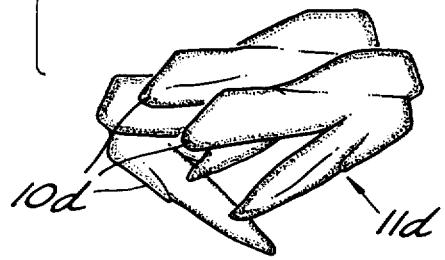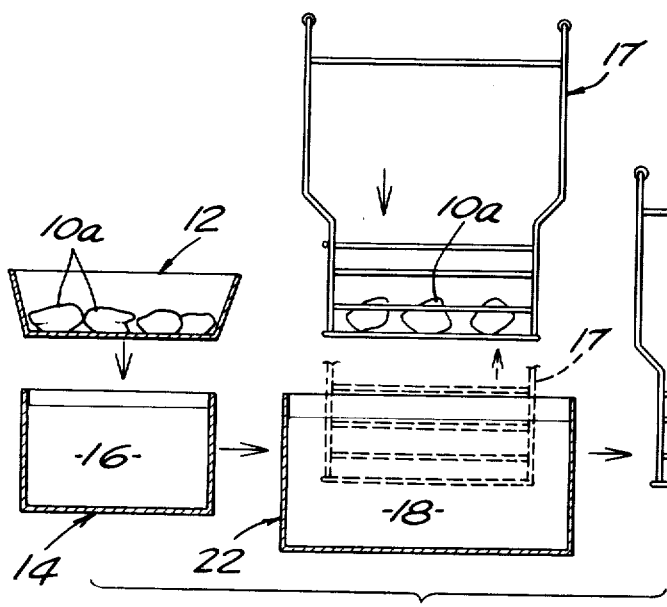

HARVEY R. KAUFMAN
INVENTOR.

BY
Bernard M. Smukler
ATTORNEY

PROCESS FOR DEEP FRYING OF CHICKEN

This application is a continuation in part of my co-pending application, Ser. No. 31, filed Jan. 2, 1970, now abandoned, for Process For Deep Frying of Chicken.

The present invention relates in general to a method or process for producing fried chicken, and in particular to a deep fat process for cooking such fried chicken. The unique method described hereinbelow contemplates the deep-fat cooking of various segregated chicken parts, after application of a special formula batter mix to their respective surfaces, with the amount and composition thereof being precisely predetermined. Further, as will hereinafter be shown, the process includes, among other things, the accurate control of temperature, cooking time, sizes of serving pieces, separation of chicken parts and storage of the cooked chicken parts. As a result superior fried chicken parts having unique qualities of taste, texture and appearance are produced.

A great number of recipes for cooking fried chicken or various parts thereof are available and well known in the art. However, it has been found through considerable experimentation and usage that in order to produce high quality fried chicken parts having superior taste, texture and appearance, certain unique methods must be followed as hereinafter set forth. If they are not adhered to, an inferior product results. For example, if the batter coating is too thick when applied to the skin of the chicken parts, the interior portions of the parts will not be completely cooked unless the exterior portions are permitted to become burned or dried out. Conversely, if the batter coating is too thin when applied to the skin of said chicken parts, then upon completion of the cooking process the exterior portions of such parts will either be burned or too dark in appearance and will not give a flaky texture thereto. Further, if the consistency of the batter is not precise, the applied batter coating may easily run off the skins of the raw parts so that it does not contribute in any way to the desired unique flavor of the product. As a result, it is clear that the quantity of said batter must be completely controlled so that it, in effect, becomes part of and integral with the skins of said chicken parts. The present process, among other things, insures that the batter material is of a substantially precise and predetermined viscosity; that the temperature thereof, prior to being applied on said raw chicken parts, is within a certain limited range; that upon such application, the correct amount of batter remains on the surface of each piece of chicken; that each chicken part remains completely coated by the said batter during the cooking process; and that the chicken parts so coated with batter be placed for a predetermined period of time in an oil or shortening having certain qualities thereto and which is kept within a certain limited temperature range during the cooking process. As a result of the above, a great number of chicken parts having superior taste, texture and appearance may be easily produced.

It is, therefore, the primary object of the present invention to provide a novel process for quickly and thoroughly cooking chicken parts which have a batter thereon that is proper in thickness, color, flakiness and crispness.

An additional object of the present invention is to provide a process for frying chicken parts which includes a step by which the first cooked parts are first sold to the public.

Another object of the present invention is to provide a process for frying chicken parts in which the time, temperature and application of batter are so correlated to the sizes and types of serving pieces that optimum taste, appearance and texture of the cooked chicken parts are achieved.

A further object of the present invention is to provide a systematic first-in and first-out storage procedure for the cooked chicken parts so that the parts which have been cooked first may be easily identified so that they may be first sold to the public.

An additional object of the present invention is to provide a process for frying chicken parts, as aforesaid, which includes means for holding the cooked chicken parts at a proper serving temperature until same are sold to the public.

Other and further objects and advantages of the present invention include having the said process relatively inexpensive so that a great number of chicken parts may be cooked and sold at reasonable prices; having the exterior portions of said chicken parts flaky and crisp, while keeping the interior portions of said parts juicy and tender; and such objects, advantages and capabilities will be readily apparent and better understood by referring to the following description and claims, taken in conjunction with the accompanying drawing, in which:

FIG. 1 illustrates a raw chicken resting on a preparation table (not shown);

FIG. 2 illustrates the segregation into groups of various parts of the chicken to be cooked in accordance with the present process;

FIG. 3 is a schematic view of the process by which the batter is made;

FIG. 4 is a schematic view of the process by which the chicken parts are cooked and subsequently stored;

Figure 5:
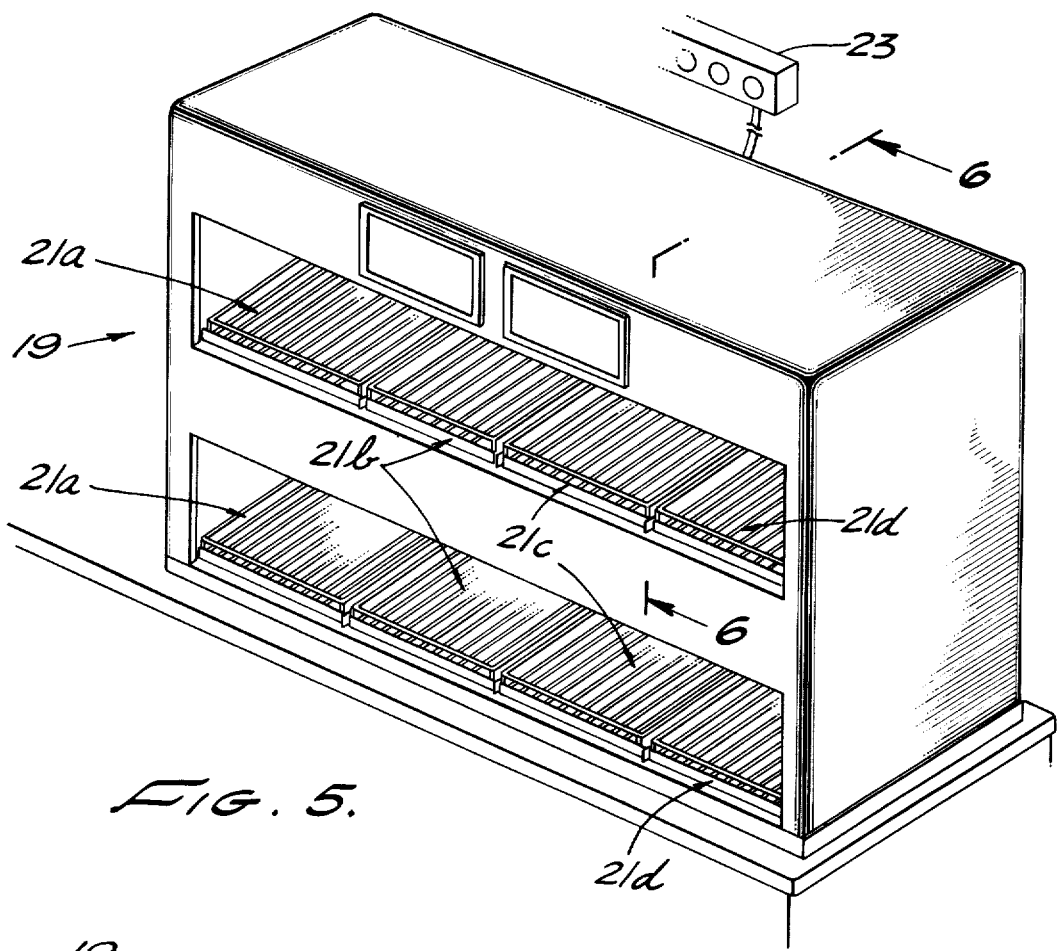
FIG. 5 illustrates the unique heat holding unit of the present invention.
Figure 6:
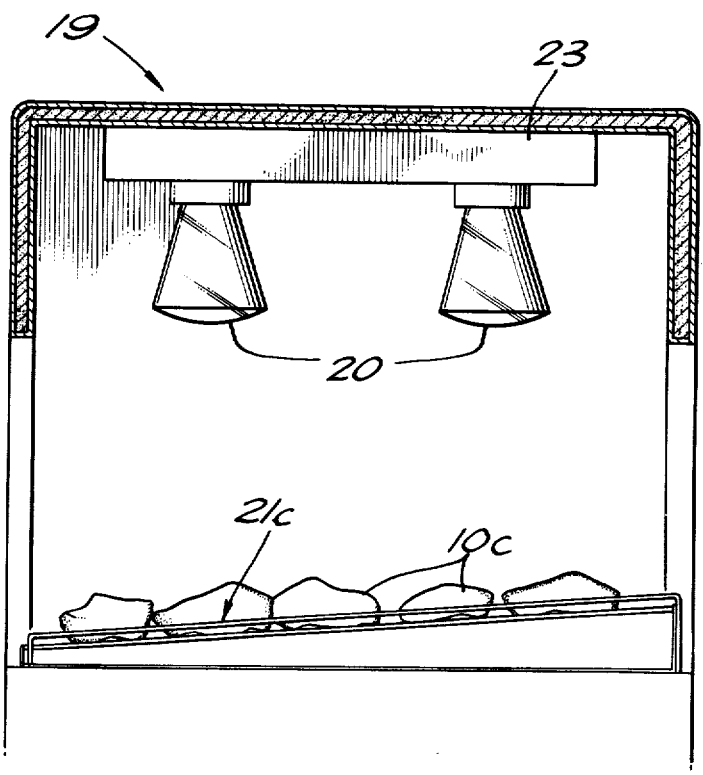
FIG. 6 is a cross sectional view of the said holding unit taken along lines 6—6 of FIG. 5.

With reference to the drawing in detail, a raw frying chicken 10, selected to be within a desired range of body weight, in addition to other similar chickens (not shown), is first cut into the following serving pieces or parts, to-wit: thighs 10a, legs 10b, breasts 10c and wings 10d. The individual chicken parts 10a, 10b, 10c and 10d are then segregated into four groups, to-wit: thighs, legs, breasts and wings, 11a, 11b, 11c and 11d, respectively, with each group having the same chicken parts therein. Of course, said chicken parts 10a, 10b, 10c and 10d may be presegregated and/or packaged, but in any event some of said parts will usually be refrigerated until they are ready for further processing. However, the parts which are ready to be cooked are promptly placed in a holding tray 12.

Prior thereto, and as may be appreciated by viewing FIG. 3 of the drawing, the batter mix 16 was prepared as follows: five pounds special dry formula mix 13 are combined in a bowl 14 with eight pounds water 15, with the temperature of said water being between 70 and 75° F. Thus, the just-discussed wet batter mix will consist of 61.54% water and 38.46% dry formula mix. The said formula mix 13 consists of the following ingredients and in the following range of weights by percent: salt, 5.0–20.0%; spices and seasonings, 1.0–8.0%; baking powder, 0.2–4.0%; flour, 58.0–93.0%; egg yolk, 0.1–5.0%; and milk solids, 0.2–15.0%. As may be appreciated, the said ingredients 13 may vary within the range of percentages set forth herein without departing from the spirit or scope of the present invention. Such variations occur due to local tastes, but all of such ingredients 13 are required and they should be within the range set forth herein. The said mixture 16 is then whipped for approximately five minutes to insure that all lumps therein have been removed. As may be appreciated, if the said mixture 16 is not so whipped, the dry batter formula mix 13 will not completely dissolve within the said water 15. Conversely, if the said mixture 16 is whipped for too long a period of time, air bubbles tend to form therein. In either event, improper mixing and whipping adversely affects the desired viscosity and consistency of the said batter mix 16. After considerable experimentation, it has been found that for best results the said batter mix 16 should be at 70° or 75° F and have a viscosity sufficient to completely drain a G4 cup having an orifice of 0.168 inches in 25 seconds, all based upon a Zahn Viscosimeter. In addition, the said batter mix 16 should be made in relatively small quantities so as to avoid same from becoming stale. Further, the said mix 16 should be applied to the exterior portion of said chicken parts 10a, 10b, 10c and 10d, within two hours after it has been whipped so as to avoid an undesirable settling effect. Application of said batter mix 16 to the uncooked chicken parts 10a, 10b, 10c or 10d should occur within said temperatures; otherwise, a substantial change of temperature will seriously alter the viscosity of said batter mix 16.

As mentioned above, after a sufficient quantity of batter mix 16 is obtained in accordance with the above described method, all within the said large bowl 14, the chicken parts from a particular group 11a, 11b, 11c or 11d, are then immersed within said batter 16 for approximately 5 to 10 seconds so as to insure proper coverage over the exteriors of each of said chicken parts. After such immersion, the parts 10a, 10b, 10c or 10d, are quickly removed from said bowl 14, all excess batter 16 is removed from their surfaces, and they are placed in the submerged holding device 17 described hereinbelow.

A holding device 17, adapted to retain a large number of chicken parts therein, is immersed into a large vessel 22 containing oil or shortening 18 preheated to approximately 330° F to wholly immerse the chicken parts into a bath of oil or shortening. As may be appreciated, it is very important that the cooking time and temperature be correlated so that proper flakiness and crispness of the finished product results. Thus, it is desirable to obtain a "quick skin" on the exterior portion of each of said chicken parts so that the cooking oil 18 does not seep into or saturate the interior portions of such parts. If the parts remain in the oil 18 for too long a period of time or if the temperature of said oil 18 is too low so that continued immersion of said parts is necessary to completely cook same, the parts 10a, 10b, 10c or 10d will eventually become saturated by said oil 18 and have a greasy taste thereto. The oil or shortening 18 is 100% hydrogenated so that complete interaction with said batter mix 16 results. After approximately 6½ minutes of such submersion, the said chicken parts are removed from the shortening or oil 18 by lifting the said holding device 17, and the operator thereupon promptly separates each of said parts from contact with any other part. Such separation is necessary so that complete and thorough cooking of each part can occur. As may be appreciated, if the chicken parts remain in contact with other parts during the entire cooking process, portions of the exteriors of such parts which are in contact with the other parts will remain in a somewhat uncooked condition so that the batter mix 16 immediately adjacent to such portions will likewise not obtain the desired flakiness and crispness.

Through experimentation, it has been found that many foods, including chicken, lose their tenderness and juiciness if they experience substantial temperature increases, decreases and increases during the cooking process. This effect is sometimes known, among others, as parboiling. Further, it has been found that such substantial temperature changes which occur over a prolonged period of time cause such foods to become hard and dry. However, a substantial temperature change over a short period of time does not have an effect on the interiors of such foods, but do cause the exteriors thereof to become crisp and flaky. Thus, it is now apparent that another important reason for the removal and subsequent insertion of said chicken parts from the oil 18 within the cooker 22 is to cause the exterior portions of said parts to undergo a substantial and sudden temperature change within a very short period of time, but prevent the interior portions of said parts from undergoing such a change. Consequently, the separation procedure should be approximately, but does not exceed, 30 seconds in duration so that the interior portions of said chicken parts do not have sufficient time to cool but continue to remain at a temperature only slightly less than 330° F. However, such limited time is nevertheless sufficient to cause the exterior portions thereof to experience a substantial and sudden reduction of temperature. Consequently, when the said parts are again submerged in said shortening or oil 18, which has been held at 330° F in said cooker 22, the second application of intense heat causes the exterior portions of the batter coated parts 10a, 10b, 10c or 10d to again rapidly increase in temperature until they are at 330° F. As a result of such sudden and rapid temperature changes, the exterior portions of said parts harden and become crisp and flaky. However, the interiors of said parts continue to be juicy and tender because they have not experienced such changes in temperature. Of course, if the time for the separation and temperature change procedures is excessive so that the interior portions of said parts cool down considerably from 330° F, when they are again submerged in the said oil or shortening 18, the sudden application of intense heat will likewise cause such parts to lose some of the desired juiciness and tenderness. Further, during such separation procedure and at the decreased surface temperature of said chicken parts, the batter mix 16 is better able to achieve a coating consistency on the exterior portions of said parts and harden so that thereafter the parts will not adhere to one another. In any event, once said separation occurs the said chicken parts are again immersed in said shortening or oil 18, as aforesaid, and are thereafter cooked for a total of approximately 9 to 12 minutes (depending upon the particular parts desired to be cooked), which time includes the period for separating said parts. As a matter of fact, the total cooking time for chicken wings 10d should be nine minutes; and chicken legs 10b, thighs 10a and breasts 10c 12 minutes. Thus, for example, the serving pieces are immersed the second time in said preheated shortening or oil for two minutes if the particular group of pieces consists of chicken wings; and are immersed the second time in said preheated shortening or oil for five minutes if the particular group consists of legs, thighs, breasts or a combination thereof.

Upon completion of the above steps, the chicken parts are removed from immersion within said oil or shortening 18 by lifting said holding device 17 therefrom and all excessive oil or shortening 18 is allowed to drain from such parts for approximately one minute. The said holding device 17, together with the chicken parts therein, is then taken to a heat holding unit 19 having infra-red lights 20 therein. Special tray racks 21 are provided within said heat holding unit 19, and each rack 21a, 21b, 21c and 21d thereof holds a particular group 11a, 11b, 11c or 11d of said chicken parts. As may be appreciated by viewing FIG. 5 of the drawing, the said racks 21a, 21b, 21c and 21d are tilted relative to the floor of the building and are adapted to slidingly receive the chicken parts which are placed thereon, so that the chicken parts first cooked are at the lower end of the said racks and the newly cooked chicken parts are at the upper end of said racks 21a, 21b, 21c and 21d. In any event, oil 18 continues to drain from the surfaces of said chicken parts 10a, 10b, 10c or 10d, into receptacles (not shown) provided at the bottom of said tray racks 21 so that after a few minutes the chicken parts are substantially free of all excess shortening or oil 18. Further, the said infra red lights 20 are connected to reostats 23 so that the temperature thereof is adjustable. However, a temperature of 120° F or more should be maintained. As a result, when completing an order, the server of said chicken parts 10a, 10b, 10c or 10d can easily remove the parts stored at the lower end of said tray racks 21, which happen to be the parts longest remaining therein, so that the public is never served chicken parts which have been "forgotten" in any of said racks 21a, 21b, 21c or 21d. Chicken parts so cooked will keep well for many hours in said heat holding unit 19 without loss of flavor, texture or appearance.

It has been found that chicken fried in the above manner is not only tender and tasty but has an outer coating which is crispy and flaky and which has a golden brown color thereto. In addition, the batter-skin of said parts does not have a deep brown or black appearance which is often the case where continued heat must be applied at high temperatures to cook such parts, or where the batter mixture 16 is too thin so that they cook too rapidly.

Of course, the present invention is not intended to be restricted to any particular form or arrangement, or any specific embodiment disclosed herein, or any specific method of operation or use, since the same may be modified in various particulars or relations without departing from the spirit or scope of the claimed invention hereinabove shown and described of which the methods shown are intended only for illustration and for disclosure of an operative process for cooking chicken, and not to shown all of the various forms and modifications in which the invention might be embodied.

I claim:

1. A single continuous process of frying chicken comprising the steps of:
    cutting raw chicken into several serving pieces;
    segregating said serving pieces into groups having the same parts therein;
    preparing a dry formula mix consisting of about 5-20 weight percent salt, about 1-8 weight percent spices and seasonings, about 0.2-4 weight percent baking powder, about 58-93 weight percent flour, about 0.1-5 weight percent egg yolk, and about 0.2-5 weight percent milk solids;
    preparing a batter mix by combining said dry formula mix with water in a weight ratio of about 5 to 8 with said water being between about 70 and about 75° T;
    whipping said batter mix for about five minutes and adjusting the temperature thereof to a range of about 70-75° F to produce a smooth mix which is free of air bubbles and having a viscosity sufficient to completely drain a G4 cup having an orifice of 0.168 inches in 25 seconds based upon a Zahn Viscosimeter, said whipped batter mix being applied to said chicken parts within two hours after preparation of said mix so that the viscosity thereof remains essentially constant;
    immersing said serving pieces into said about 70°-75° F whipped batter mix for approximately 5 to 10 seconds to cover the exterior surface of each serving pieces;
    removing said covered serving pieces from said whipped batter mix;
    removing from said covered serving pieces any whipped batter mix which is in excess of an amount of said mix necessary to cover the exterior of said pieces;
    heating a hydrogenated cooking fluid to a temperature of about 330° F;
    wholly immersing said covered serving pieces into said 330° F cooking fluid for a period of about 6¼ minutes to produce partially cooked pieces without causing said pieces to become saturated;
    removing said pieces from said cooking fluid for about 30 seconds thereby suddenly exposing the exterior portions of said partially cooked chicken to a sudden reduction in temperature whereby the interior portions thereof remain at a temperature only slightly less than 330° F so that interior portions of said pieces do not undergo substantial temperature changes during the entire cooking process while the exterior surface portions thereof do experience a sudden temperature change to become crisp and flaky while said interior portions remain tender and juicy;
    separating said partially cooked pieces from contact with each other while said pieces are removed from said fluid to insure a thorought cooking of each piece;
    reimmersing said pieces in said 330° F cooking fluid for a time sufficient to produce a total cooking time of about 9 to 12 minutes, which time includes the time said partially cooked pieces are removed from said cooking fluid to suddenly reduce the temperature of the exterior portions of said pieces, to complete the cooking of said pieces and produce cooked pieces;
    removing said cooked pieces from said cooking fluid;
    draining any cooking fluid remaining on said cooked pieces from said cooked pieces; and
    storing said cooked pieces at a temperature of at least about 120° F.

2. A process of frying chicken as described in claim 1, whereby the said serving pieces are chicken wings which are immersed the second time in said preheated fluid for two minutes.

3. A process of frying chicken as described in claim 1, whereby the said serving pieces are legs, thighs, breasts or a combination thereof which are immersed the second time in said preheated fluid for 5 minutes.

4. A process of frying chicken as described in claim 1, whereby the said wet batter mix consists of 61.54% water and 38.46% dry formula mix.

5. The process of frying chicken as defined in claim 1 wherein the step of storing said cooked pieces includes a step of arranging said cooked pieces in an essentially linear arrangement.

* * * * *